INVENTOR.
THEODORE LOEW

United States Patent Office 3,530,031
Patented Sept. 22, 1970

3,530,031
LAMINATED BELT CONSTRUCTION
Theodore Loew, Schenectady, N.Y., assignor to Cee Bee Mfg. Co., Inc., Brooklyn, N.Y., a corporation of New York
Filed Sept. 28, 1967, Ser. No. 671,434
Int. Cl. B32b 3/10; A41f 9/00
U.S. Cl. 161—106                                            6 Claims

ABSTRACT OF THE DISCLOSURE

The disclosure sets forth a laminated belt construction backing and/or the facing have a core of vinyl polymer wrapped in textile material which may entirely cover one side of the vinyl polymer and be split at the other side of the vinyl polymer. The base or core of vinyl may be foamed so that it will be resilient. The laminated belt construction may vary in width from ½ to ¾ of an inch on the low side to 1, 2 or even 3 inches on the wide side. The plastic materials may constitute the major thickness of the belt and multiple sections may be bound together by intervening sheets of plastic material, preferably of vinyl, which should terminate short of the side edges of the split textile tubing.

---

The present invention relates to a laminated belt construction and it particularly relates to a soft, pliable, resilient belt construction.

It is among the objects of the present invention to provide a soft, pliable belt construction which may be readily utilized for women's wear but which has broader application to laminated strip material not only in the clothing field but also for decoration, trim or closures in connection with draperies, furniture covers, automobile interiors, walls, floors, household appliances, closets and the like.

It is among the objects of the present invention to provide a simple, durable plastic foam construction which will be embodied in the laminated structure so as to give a particularly soft, pliable belt construction.

Another object is to provide a laminated belt backing or complete belt construction which will have a foam element therein so as to give extra pliability and softness to the belt.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable, according to one embodiment of the present invention, to form a belt of a laminated strip which may be either extruded, cut, rolled or other forms of plastic material which is covered on its base or bottom face and side edges by a fabric material which may be woven or knitted textile material with the weft or warp extending either longitudinally of the longitudinal axis of the belt or in a criss-cross or bias-cut fashion in respect to said axis of the belt.

Preferably, the fabric may extend over the edges of the base or core material to cover merely the edges of the base, or it may extend substantially completely around the base to cover the entire base as if it were a tubular cover therefor. Any split will be on the top or inside face, which will be substantially covered by the facing.

The feature to which the present invention is particularly directed is the use of a base or core formed of a foamed plastic material, which may be vinyl foam or polyurethane foam. This material may be formed either as a vinyl plastisol with a small amount of a foaming agent, say, ½ to 2%, and a relatively large amount of the plasticizer, as 5 to 50% of dioctyl or diisooctyl phthalate orazelate. The foam material, before or after the foaming takes place, is formed into the desired width and thickness of strip, which is then covered with the fabric.

Desirably, the fabric, whether it be knitted or woven, may be provided with an inside thin layer of an adhesive material such as a thin film of a thermoplastic resin or vinyl adhesive. Less desirable are other types of adhesives which may or may not be pressure sensitive but which should preferably be heat sensitive.

In one form of the invention, the base may have a single strip of vinyl or polyurethane foam or the vinyl or polyurethane foam may carry on one or both sides thereof a layer of vinyl sheet material which will cover the foam. This sandwich or lamination forming the base material is then covered by the split sleeve of textile material.

In another form of the invention, the base consists of a non-porous, non-foam strip of a plastic material, and desirably a strip of a thermoplastic material such as vinyl chloride-acetate polymer, polyethylene or polypropylene, which is also covered by a split tube of textile material so that the back and side edges may be partly covered, while the top inside face may be substantially completely covered, or a suitable gap may be made therein.

In either case, to the top face of the rear of the back material there is applied a thin layer of a plastic strip which will act as an adhesive under heat and pressure and which should terminate short of the edges of the wrapped material.

The top covering material may consist of an inturned edge of a strip of fabric with the edges turned inwardly with or without interior facing or lamination of a strip of thermoplastic adhesive material.

Preferably, however, this split textile tube is wrapped around a strip of foam material, whether it be polyvinyl or polyurethane foam, which also may be covered on one side or on both sides by a surfacing of vinyl or by strips of vinyl or polyethylene sheet material, as the case may be.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which wall within the scope of the claims hereunto appended.

In the drawings wherein like reference characters denote corresponding parts throughout the several views.

Figure 1:
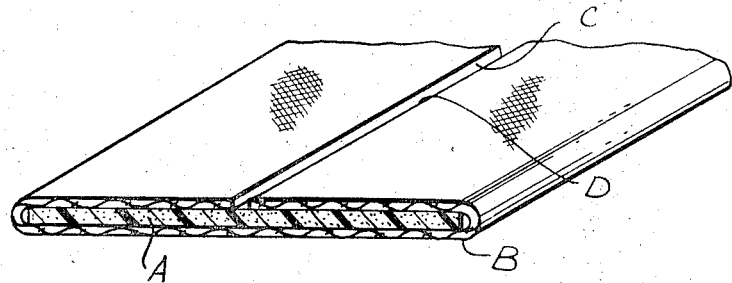
FIG. 1 is a fragmentary diagrammatic sectional view showing a belt backing according to the present invention which may be used as the base of a woman's belt or for other suitable strip laminated material.

Referring to FIG. 1, there is shown a construction suitable for use as a belt backing and which comprises a core or base A which may consist of an extruded, cut or rolled vinyl polymer sheet. This base A may also be an impregnated fabric of either woven or knitted character which has been impregnated with a thermoplastic resin. This base A is covered or wrapped in the textile tube B, which is split as indicated at C. The edges of the split, as indicated at D, may be pinked or cut and the fabric forming the tube B may be cut on the bias, preferably extending longitudinally.

Figure 5:
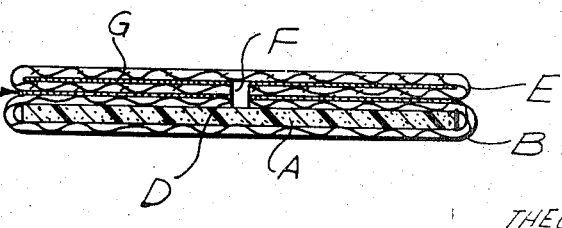
FIG. 5 is a transverse sectional view similar to FIG. 4, of an alternative embodiment.

In one preferred embodiment of FIG. 1, the base A may consist of a strip of foamed vinyl plastic or polyurethane plastic which will make a resilient back, and, with or without the addition of an intermediate plastic layer, that may be covered with a flattened tube of a facing fabric E as shown in FIG. 5. Thus the strip of FIG. 1, after it has been formed and integrated with heat and pressure, may be covered by a flattened split tube E, with the split F in tube E being covered by the backing of FIG. 1 and with the facing material E preferably matching in color or design the fabric cover or split tube B of the backing.

Figure 2:
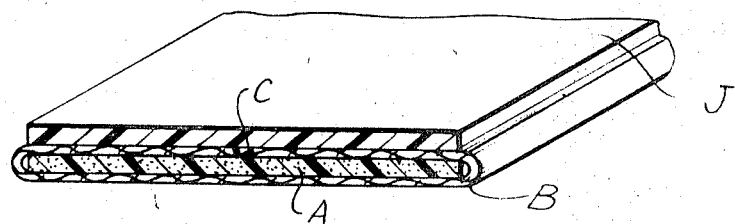
FIG. 2 is a diagrammatic top perspective view similar to FIG. 1, showing an application of an intermediate layer of an adhesive to the top of the backing so as to form a better adhesive attachment to the face of the belt.

The faces G of the flattened tube E may be covered or provided with an inside lamination of a vinyl plastic material and the mating surfaces between the facing and the backing may be provided with an intermediate surfacing of a thermoplastic or pressure sensitive adhesive in the position H. Instead of the assembly shown in FIG. 5, the backing, as shown in FIG. 2, may carry an extra lamination J which will act as a pressure sensitive adhesive and to which the facing may be secured. The facing may consist of the flattened tubular material E, as shown in FIG. 5.

Figure 3:
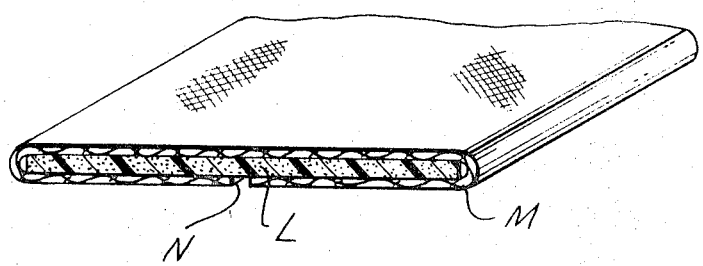
FIG. 3 is a fragmentary top perspective view similar to FIGS. 1 and 2, showing the facing which may be applied to the backing of FIGS. 1 and 2.

In FIG. 3 is shown a facing construction consisting of a core strip L of polyvinyl or polyurethane foam, and, less preferably, of an extruded rolled or cut plastic sheet L, which is wrapped in a split tube M having a split at N on its inner face. The edges of the split end may be cut straight or pinked. This split tube M then may be assembled either with the backing shown in FIG. 1 or that shown in FIG. 2, by application of heat and pressure or by an iron. If desired, the side edges may be stitched as shown at P, although this is not necessary.

Figure 4:
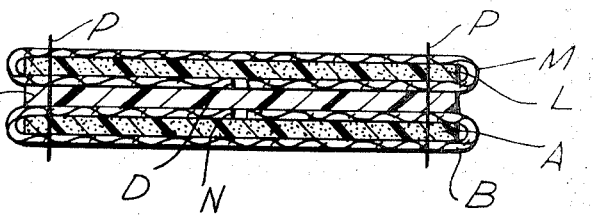
FIG. 4 is a tranverse vertical sectional view, showing the combinations of the embodiments of FIGS. 2 and 3 combined together to form a final belt construction.

In the cross-section of FIG. 4, there is shown the facing section of FIG. 3, combined with the backing section of FIG. 2. Both of the base or core materials A and L may be polyvinyl or polyurethane foam, and the fabric tubes M and B may be stopped short of meeting at the center, or they may meet at the center, as indicated at D and N. The intermediate adhesive material J will aid in the unitizing or integrating of the laminate together.

Having now particularly described my invention, I claim:

1. A laminated foam filled belt comprising a backing structure and a facing structure, at least one of said structures having a core of resinous foam, each of said structures having fabric covers with the outside edges of each of said cover being turned inwardly, the edges of said foam core being covered by the inturned edges of one of said fabric covers, said facing structure being assembled on said backing structure with the inturned edges of both of said structures being disposed between the covers, and means adhesively securing said backing structure and facing structure together thereby to form a soft pliable laminated construction.

2. The belt of claim 1, wherein both of said structures has a core, the core of said facing structure being said foam strip and said core for said backing structure being a vinyl plastic strip.

3. The belt of claim 1, wherein both of said structures have a core of foam plastic strips.

4. The belt of claim 1, wherein the backing structure and the facing structure are sealed together by an intermediate layer of vinyl resin.

5. The belt of claim 1 wherein said fabric covers are bias-cut so that the weft and warp threads of the fabric are at an angle to the longitudinal axis of the belt.

6. The belt of claim 1 wherein the interior surface of the folded cover for the other of said structures is coated with a vinyl plastic material.

References Cited

UNITED STATES PATENTS

| | | | |
|---|---|---|---|
| 2,353,854 | 7/1944 | Schultheiss | 2—338 |
| 2,939,151 | 6/1960 | Cuttler | 2—322 |
| 3,220,901 | 11/1965 | Holmstrom et al. | 156—79 |
| 3,378,864 | 4/1968 | Cornes | 9—11 |
| 3,400,040 | 9/1968 | Osgood | 161—121 XR |

FOREIGN PATENTS 546,219    7/1942    Great Britain.

JOHN T. GOOLKASIAN, Primary Examiner

W. E. HOAG, Assistant Examiner

U.S. Cl. X.R.

2—311, 338; 156—216; 161—161